United States Patent [19]

Iizuka et al.

[11] Patent Number: 4,812,015
[45] Date of Patent: Mar. 14, 1989

[54] LENS BARREL

[75] Inventors: Toshimi Iizuka, Kanagawa; Shigeru Kamata, Tokyo, both of Japan

[73] Assignee: Canon Kabushiki Kaisha, Tokyo, Japan

[21] Appl. No.: 847,206

[22] Filed: Apr. 2, 1986

[30] Foreign Application Priority Data

Apr. 2, 1985 [JP] Japan .................. 60-048199[U]
Apr. 11, 1985 [JP] Japan .................. 60-052849[U]

[51] Int. Cl.⁴ .................................. G02B 7/02
[52] U.S. Cl. ........................... 350/252; 350/255; 350/257
[58] Field of Search ............... 350/252, 257, 417; 785/138, 382, 921; 403/DIG. 8

[56] References Cited

U.S. PATENT DOCUMENTS

| | | | |
|---|---|---|---|
| 2,388,587 | 11/1945 | Wilson | 285/138 |
| 2,465,083 | 3/1949 | Gradisar | 350/252 |
| 3,441,339 | 4/1969 | Rederer et al. | 350/255 |
| 3,749,479 | 7/1973 | Kempf | 350/252 |
| 3,817,601 | 6/1974 | Colaiace et al. | 350/255 |
| 4,575,133 | 3/1986 | Nattel | 285/921 |
| 4,647,155 | 3/1987 | Bjorklund et al. | 350/252 |

FOREIGN PATENT DOCUMENTS 906278 9/1962 United Kingdom ............... 350/252

*Primary Examiner*—John K. Corbin
*Assistant Examiner*—Martin Lerner
*Attorney, Agent, or Firm*—Toren, McGeady & Associates

[57] ABSTRACT

A holding member for holding an optical member is made of plastic material, and provided with at least two fit portions on the inner diameter surface thereof in such a way as to project toward the optical axis and also to determine the holding position of the optical member. The holding member further includes a resilient portion at a position of almost equal distance to both fit portions to hold the optical member by pressing it against the fit portions.

6 Claims, 6 Drawing Sheets

LENS BARREL

BACKGROUND OF THE INVENTION

1. Field of the Invention

This invention relates to lens holding barrels made of plastic material by unified molding techniques.

2. Description of the Prior Art

Molded plastic barrels for lenses have already been known as, for example, in Japanese Laid-Open Utility Model Application No. SHO 59-90906. As shown in FIGS. 1 and 2, the lens barrel 1 has two protuberances 1b and 1c on the inner surface 1a thereof. A plurality of lenses L in the barrel 1 are thrusted to one radial direction. Hence, although the optical axes of the lenses are less deviated from one another, they are off-set to the ideal axis of the barrel by about the radial height of the protuberance 1b, 1c. Since the inner diameter of the barrel is necessarily slightly larger than the outer diameter of the lens, such a decentering is difficult to avoid.

As another conventional example, mention may be made of the lens cell shown in Japanse Laid-Open Utility Model Application No. SHO 57-167408. This cell is formed by a metal mold and has three protuberances on the inner surface thereof.

By the way, in the former conventional example, the position of the optical axis of the lens is determined by the two protuberances 1b and 1c and a point of contact of the lens with the inner surface of the barrel 1a. Since, as the barrel 1a and the protuberances 1b and 1c are formed by a single metal mold, the optical axis of the lens is made to approach the ideal axis of the barrel, or a molding error is removed, there is only one freedom of correction of the metal mold in the direction indicated by an arrow in FIG. 1. Therefore, the problem of decentering the optical axis of the lens has been left unsolved.

In the latter conventional example, the diameter of a circle passing the tips of the three protuberances had to be larger than the diameter of the lens by machining tolerances. As the lens was loosely fitted in the barrel in most cases, there was a drawback that no means was provided for absorbing that looseness.

SUMMARY OF THE INVENTION

An object of the present invention is to eliminate the above-described drawbacks of the prior art, and to provide a lens barrel which enables a plurality of lenses to be held steadily while the discrepancy of each of the optical axes of the lenses from an ideal axis of the barrel is limited to a minimum, so that the precision accuracy is greatly improved.

Another object is to make use of plastics as the material of a holding member for holding an optical member such as a lens and to provide for the holding member with at least two fit portions on the inner diameter surface thereof to hold the optical member in a prescribed position with respect to the optical axis of the optical member, and further with a protuberance portion positioned at almost equal distances to each of the two fit portions to hold the optical member by pressure, whereby the elasticity of the plastic material of the holding member assures steady retention of the optical member in the prescribed position, and, when the optical member is plural in number, their optical axes and axial positions are insured against decentering and shifting, respectively.

Still another object is to provide for the plastic holding member with clamping means for the optical member in the form of a reaction pad inserted into a space between the inner surface of the holding member and the edge of the optical member through a window formed across the wall of the holding member, whereby the retaining of the optical member can be controlled from the outside of the holding member.

Figure 1:
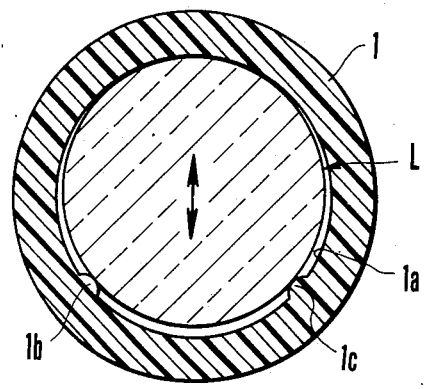
FIGS. 1 and 2 are, respectively, cross-sectional and perspective views of the conventional lens holding barrel.
Figure 2:
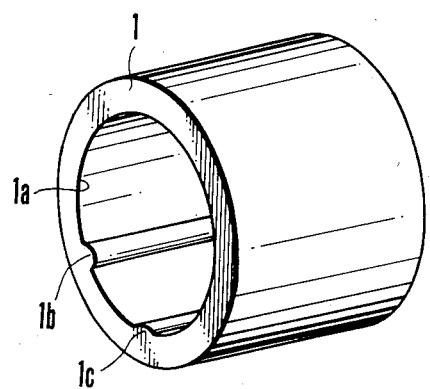
Figure 3:
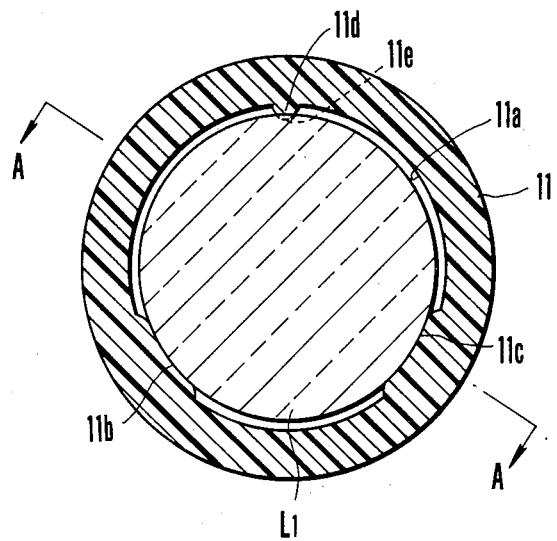
FIGS. 3 and 4 are, respectively, cross-sectional and side sectional views of a first embodiment of a lens holding barrel according to the present invention.
Figure 4:
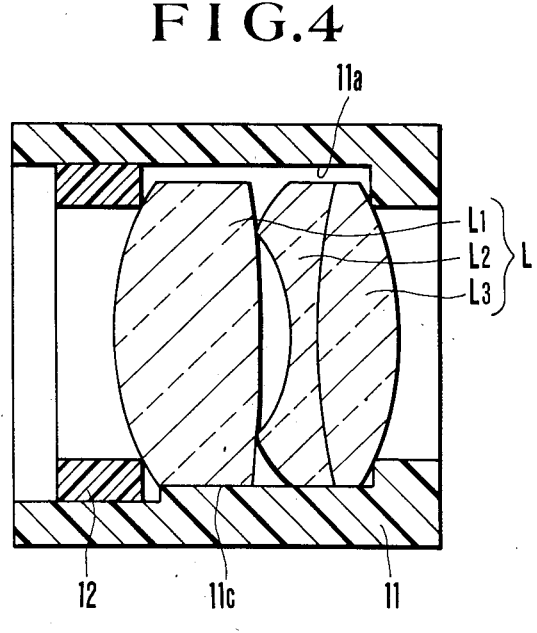

DETAILED DESCRIPTION OF THE PREFERRED EMBODIMENTS:

Referring first to FIGS. 3 and 4, the present invention is described in connection with a first embodiment thereof. A lens frame 11 is made of plastic material by molding techniqes. In order to support a lens L (for example, comprising three lens units L1 to L3) at two places along each of their edges, the inner surface 11a is provided with two fit portions 11b and 11c projecting radially inwardly thereof and extending in parallel with the optical axis. The top of each of the fit portions (or lugs) 11b and 11c is curved to the same diameter as that of the lens L and has a small fitting area. The lens frame 11 is further provided with an elastic protuberance 11d on the inner surface 11a at almost equal distances from the fit lugs 11b and 11c. In this instance, the lugs 11b and 11c and the protuberance 11d are spaced 120° from each other. The height of the tip 11e of the protuberance 11d is slightly higher than that of the curved tops of the lugs 11b and 11c, so that the tip 11e slightly projects into the inside of a circle defined by the curved tops of the fit lugs 11b and 11c.

To mount the lens units L1 to L3 in the frame 11, each lens unit is inserted into one open end of the frame 11, thereby the tip of the protuberance 11d is elastically compressed to allow for further inward movement of the lens units. When the lens units are seated in the prescribed positions, they are steadily held in the radial directions. Then, a retainer ring 12 is fitted in the inner diameter of the frame 11, pressed against the lens unit L1, and fixedly secured to the frame 11. Thus, a barrel having the lens units L1 to L3 held in their prescribed positions does not encounter any later production of any looseness of the lens unit L1 to L3 in the radial and axial directions.

Figure 5:
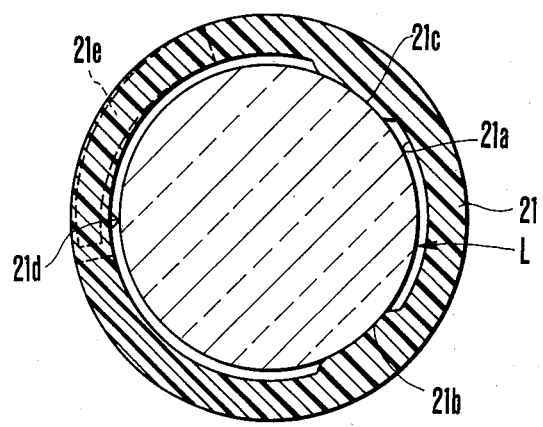
FIGS. 5 and 6 are respectively, cross-sectional and perspective views of a second embodiment of the invention.
Figure 6:
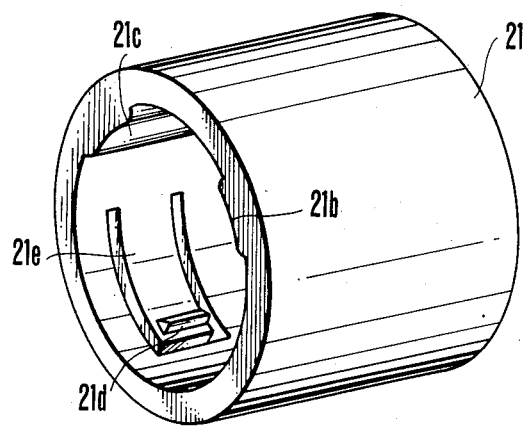

FIGS. 5 and 6 illustrate a second embodiment of the invention. A lens frame 21 is formed in unison with its various portions by molding techniques of plastic material. Of these portions, two narrow band-shaped fit portions 21b and 21c are provided on the inner surface 21a angularly separated by about 120°, projecting radially inwardly thereof and each having a concave fit surface whose radius of curvature is equal to that of the lens L. Another portion is a leaf spring 21e at almost equal distances from the fit portions 21b and 21c. The free end of the leaf spring 21e has a protuberance 21d extending radially inwardly of the inner surface thereof and slightly entering a circle defined by the concave fit surface of the fit portions 21b and 21c.

To steadily hold a lens L in the frame 21, the lens L is inserted into an open end of the frame 21 and then seated in radial alignment with the protuberance 21d, so that the lens L is pressed against the fit portions 21b and 21c by the leaf spring 21e.

According to the first and second embodiments of the invention, as has been described above, the lens is thrusted on the two fit abutments by an elastic or resilient protuberance just opposite to the center of the distance between the two abutments with respect to the optical axis of the lens, thereby giving advantages that as the lens is constructed with a plurality of elements, their optical axes can be brought into coincidence with each other with high accuracy and reliability, that the discrepancy of their optical axes from an ideal one is limited to a minimum, that the lens elements can be tightly fitted in the barrel, and that the parts of the lens barrel can be easily formed in unison with the frame by using a plastic material.

Figure 7:
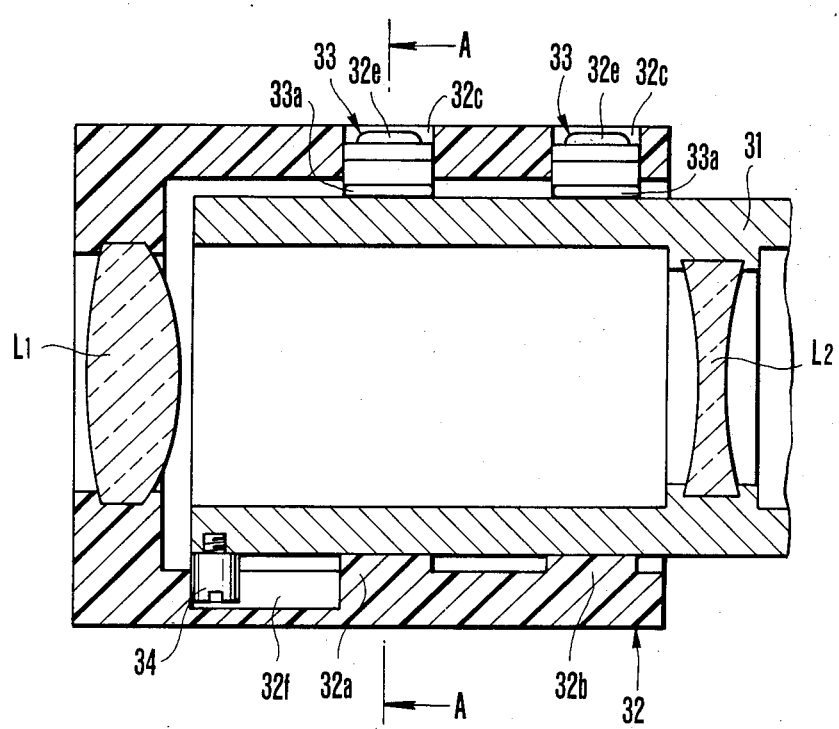
FIGS. 7 to 9 are respectively, longitudinal section, traverse section, and fragmentary exploded perspective views of a third embodiment of the invention.
Figure 8:
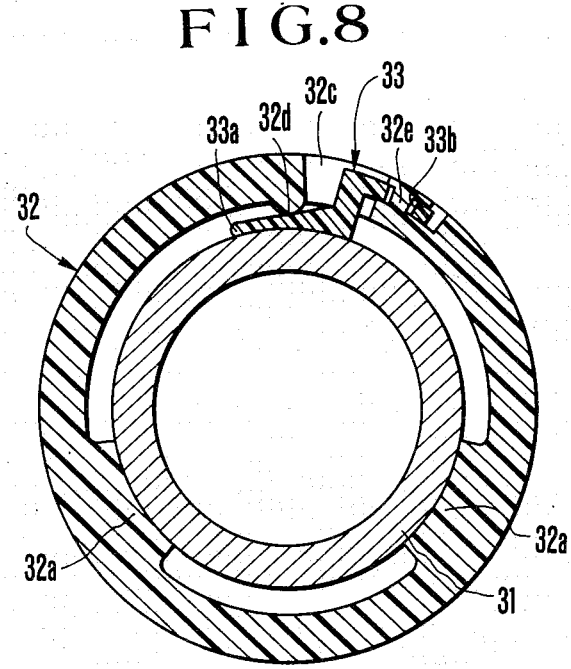
Figure 9:
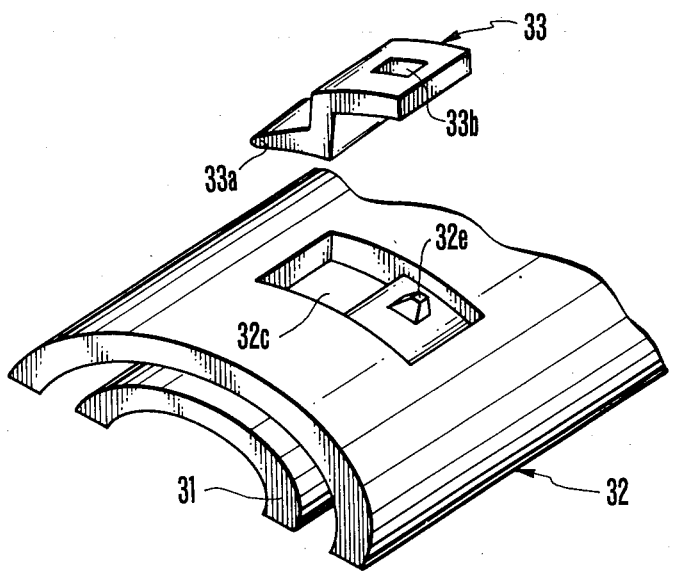

FIGS. 7 to 9 illustrate a third embodiment of the invention. An inner barrel 31 holding a lens unit L2 is fixedly secured to a camera housing (not shown). An outer barrel 32 holding a lens unit L1 is slidably fitted on the outer diameter of the inner barrel 31, and is made of plastic material.

Also, the outer barrel 32 is provided with two pairs of fit portions 32a and 32b positioned side by side in common longitudinal lines on the inner surface thereof. The height of each of these fit portions 32a and 32b is so adjusted that when the inner barrel 31 rests on them, the axis of the inner barrel 31 coincides with the axis of the outer barrel 32. In the outer peripheral surface of the outer barrel 32 are provided front and rear penetration windows 32c. On the inner surface of the outer barrel 32 at a point adjacent to each of the windows 32c, there is provided a radially inwardly projecting portion 32d. Adjacent to the opposite side of each of the windows 32c in the outer surface of the outer barrel 32 is provided a recessed portion in which lies a projection 32e having a thermo-adhesive property. The aforesaid fit portions 32a, 32b are provided with fitting surfaces at projected positions from the inner surface of the outer barrel 32 so as to hold the aforesaid inner or stationary barrel 31 in a prescribed position, for example, in axial coincidence with the outer barrel 32.

Thrust members 33, to be inserted through the windows 32c into a space between the inner and outer barrels 31 and 32, are made of plastic material and each has a front end portion 33a formed in a wedge-like shape in the circumferential direction of the outer barrel 32 so that when it is forced to enter between the inward projection 32d and the outer surface of the inner barrel 31, the latter is thrusted onto the aforesaid pairs of fit portions 32a, 32b. A rear half of each thrust member 33 is provided with a hole 33b into which the projections 32e are loosely fitted so that the thrust members 33 are circumferentially movable in order to adjust the thrusting strength.

Further, a guide pin 34 is mounted on the outer surface of the fixed barrel 31 and fits in a longitudinally elongated guide groove 32f formed in the inner surface of the movable barrel 32 to allow for axial movement of the outer barrel 32.

To set up a mounting mechanism for the lenses L1 and L2 by assembling the inner and outer barrels 31 and 32, if they are loosely fitted to each other, the thrust adjusting member 33 may be moved counterclockwise as viewed in FIG. 8. If their fitting is too tight, the thrust members 33 may be moved clockwise. After the thrust adjustment has been completed, heat is applied to the tips of the projections 32e to fixedly secure the adjusting members 33 to the movable barrel 32.

It should be noted that, in the just above-described embodiment, the movable outer barrel 32 is fitted on the outer diameter of the fixed inner barrel 31. It is of course possible that the movable barrel 32 may be otherwise fitted in the inner diameter of the fixed inner barrel 31 with a modification that the windows 32c are formed in the fixed inner barrel 31 and the adjusting members 33 are fixedly secured to the fixed inner barrel 31.

Figure 10:
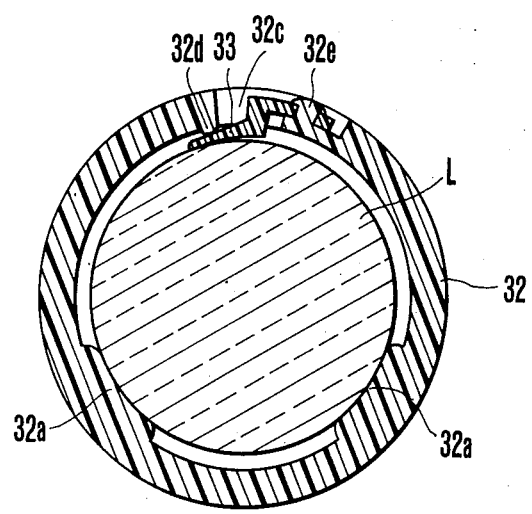
FIG. 10 is a cross-sectional view of an example of variation of the embodiment of FIGS. 7 to 9.
Figure 11:
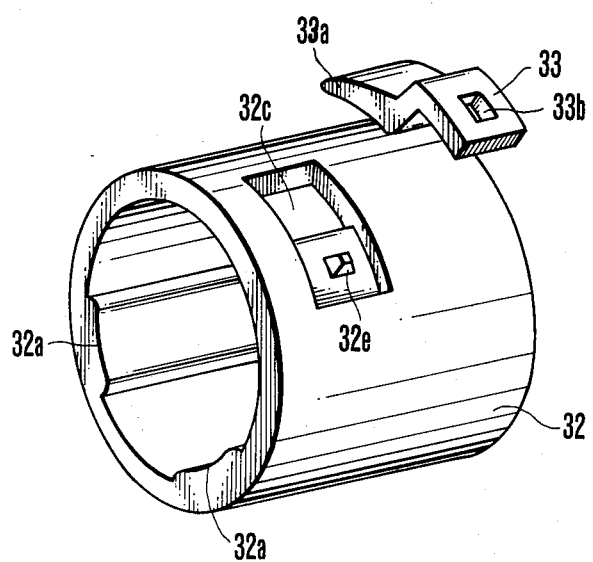
FIG. 11 is an exploded perspective view of the lens holding barrel of FIG. 10.

FIGS. 10 and 11 illustrate an example of holding the lens L directly as is different from the example of FIGS. 8 and 9 where the lens barrel 31 is held.

FIG. 10 is to directly hold the lens L in a lens holding member 32. Hence, the lens holding member 32 and thrust member 33 are similar in construction to those shown in FIGS. 8 and 9. In the case of this embodiment, when holding the lens L in the lens holding member 32, the lens L is held on the common axis of the lens holding member 32 by the fit portions 32a, 32a of the lens holding member 32, and the lens L is thrusted on the fit portions 32a, 32a by the wedge action of the thrust member 33. This produces an advantage that the assembling operation is simplified and particularly without the necessity of centering adjustment of the optical axis, the assembling operation can be carried out.

What is claimed is:

1. A lens barrel comprising:
   (a) an optical member for performing an optical action;
   (b) a holding member for holding said optical member, said holding member being made of plastic material and having at least two fit portions projecting radially inwardly of an inner surface thereof and determining a holding position of said optical member, and a window portion penetrated from the inner to an outer peripheral surface of said holding member; and
   (c) a member for thrusting said optical member on said holding member, said thrusting member having one end fixed to said holding member, and another end having a contact surface passing through said window portion to contact with an outer peripheral surface of said optical member and a front end portion of almost wedge shape to contact with a side edge of said window portion, whereby when said front end portion is inserted in between the outer peripheral surface of said optical member and said side edge, said optical member is held under pressure on said fit portions by said contact surface.

2. A lens barrel according to claim 1, further comprising a thermo-adhesive portion adjacent to the window portion of said holding member to adhere to said thrusting member when heat is applied thereto.

3. A lens barrel comprising:

(a) a lens holding member for holding an optical member;

(b) a sleeve member for holding said lens holding member, said sleeve member being made of plastic material and having at least two fit portions projecting radially inwardly of an inner surface of said sleeve member for determining a holding position of said lens holding member, and a window penetrated from the inner surface to an outer peripheral surface of said sleeve member; and (c) a member for thrusting said lens holding member on said sleeve member, said thrusting member having one end fixed to said sleeve member, and another end having a contact surface passing through said window portion to contact with an outer peripheral surface of said lens holding member and a front end portion of almost wedge shape to contact a side edge of said window, whereby when said front end portion is inserted into a space between the outer peripheral surface of said lens holding member and said side edge, said lens holding member is held under pressure on said fit portions by said contact surface.

4. A lens barrel according to claim 3, further comprising a thermo-adhesive portion provided adjacent to the window of said sleeve member to adhere to said thrusting member when heat is applied thereto.

5. A lens barrel comprising:
(a) a plurality of lenses; and
(b) a holding member made of plastic material to hold said lenses, said holding member being formed into a tubular shape and having a diameter of its inner diametric portion formed somewhat larger than a diamter of said lenses, said holding member further having fit portions which inwardly protrude in a radial direction angularly spaced less than 180° apart on said inner diameter portion, said fit portions further being formed at two places on said inner diametric portion in parallel with the optical axis and having a smooth axial length and a smooth non-threaded cylindrical circumferential width such that said plurality of lenses each make contact with said fit portions at circumferential surfaces of all of the plurality of lenses, a projected portion being formed at a place positioned opposingly to said fit portions on said inner diametric portion, said projected portion having an axial length and being deformed when said lenses are pressed into said holding member for pressing all of said plurality of lenses against said fit portions.

6. A lens barrel comprising:
(a) a plurality of lenses; and
(b) a holding member made of plastic material to hold said lens, said holding member being formed into a tubular shape and having a diameter of its inner diametric portion formed somewhat larger than a diamter of said lenses, further having fit portions which inwardly protrude in a radial direction angularly spaced less than 180° apart on said inner diameter portion, said fit portions further being provided at two places on said inner diametric portion in parallel with the optical axis and having a smooth axial length and a smooth non-threaded cylindrical circumferential width such that said plurality of lenses each make contact with said fit portions at circumferential surfaces of all of the plurality of lenses, a projected portion being formed at a place positioned opposingly to said fit portions on said inner diametric portion, said projected portions having an axial length and being elastically deformed when said lenses are inserted into said holding member for pressing all of said plurality of lenses against said fit portions.

* * * * *